US008417213B2

(12) United States Patent
Youn et al.

(10) Patent No.: US 8,417,213 B2
(45) Date of Patent: Apr. 9, 2013

(54) EMERGENCY COMMUNICATIONS SUPPORT METHOD

(75) Inventors: Ae Ran Youn, Anyang-si (KR); Kyu Jin Park, Seoul (KR); Jin Sam Kwak, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/936,473

(22) PCT Filed: Apr. 3, 2009

(86) PCT No.: PCT/KR2009/001742
§ 371 (c)(1),
(2), (4) Date: Oct. 5, 2010

(87) PCT Pub. No.: WO2009/125948
PCT Pub. Date: Oct. 15, 2009

(65) Prior Publication Data
US 2011/0034145 A1      Feb. 10, 2011

Related U.S. Application Data

(60) Provisional application No. 61/042,763, filed on Apr. 6, 2008.

(51) Int. Cl.
*H04W 4/22* (2009.01)
(52) U.S. Cl.
USPC ............................ 455/404.1; 455/9; 455/11.1
(58) Field of Classification Search .................. 455/11.1, 455/13.1, 404.1, 9, 415, 436, 432.1, 412.2, 455/3.2, 90.1, 552.1, 418, 564, 433; 370/329, 370/330, 331, 338, 339, 352, 401, 326, 235
See application file for complete search history.

(56) References Cited

U.S. PATENT DOCUMENTS

| 6,807,158 | B2 | 10/2004 | Krishnamurthy et al. |
| 2006/0125630 | A1* | 6/2006 | Parkulo ..................... 340/539.12 |
| 2008/0039016 | A1 | 2/2008 | Bonta et al. |
| 2008/0165719 | A1* | 7/2008 | Visotsky ....................... 370/315 |

FOREIGN PATENT DOCUMENTS

EP      1 852 986 A1     11/2007

OTHER PUBLICATIONS

Fujiwara, T., et al., *An Ad-hoc Routing Protocol in Hybrid Wireless Networks for Emergency Communications*, Proceedings of the 24th International Conference on Distributed Computing Systems, Workshops, IEEE, 2004, pp. 748-754.

* cited by examiner

*Primary Examiner* — Melody Mehrpour
*Assistant Examiner* — William F Rideout
(74) *Attorney, Agent, or Firm* — Morgan, Lewis & Bockius LLP

(57) ABSTRACT

Various methods for supporting emergency communication in a wireless access system that supports a relay system are disclosed. A method for supporting emergency communication in a wireless access system comprises the steps of configuring a path for emergency communication with a first mobile station of an emergency mode and one or more second mobile stations located near the first mobile station; allocating a first resource zone for emergency communication to the first mobile station; transmitting allocation information on the first resource zone to one or more of the first mobile station and the second mobile station; and receiving emergency data through the first resource zone.

11 Claims, 9 Drawing Sheets

EMERGENCY COMMUNICATIONS SUPPORT METHOD

Pursuant to 35 U.S.C. §119, this application claims the benefit of earlier filing date and right of priority to Provisional U.S. Application Nos. 61/042,763, filed on Apr. 06, 2008 which is hereby incorporated by reference as if fully set forth herein.

BACKGROUND OF THE INVENTION

1. Field of the Invention

The present invention relates to a wireless access system, and more particularly, to a method for supporting emergency communication in a relay system.

2. Discussion of the Related Art

Hereinafter, a relay station (RS) used in the present invention will be described in brief.

A standardization project of a new title called multi-hop relay is currently in progress in IEEE (Institute of Electrical and Electronics Engineers) 802.16 of 2006 since publications of the standard IEEE 802.16-2004 based on fixed subscriber mobile stations and the standard IEEE 802.16e-2005 for providing mobility of subscriber mobile stations. This standardization project handled by a task group j (IEEE 802.16j) within the IEEE 802.16 has started to discuss usage model, related terminologies, and technical requirements in the second meeting on July of 2006 after the first formal meeting on May of 2006. Hereinafter, the IEEE 802.16 task group j will be abbreviated as "802.16j".

It is expected that the relay station (RS) will widely be used in a wireless communication system for next generation. Hereinafter, for conciseness of description, the relay station will be described based on the concept of the relay station considered by the IEEE 802.16j. However, the concept of the relay station which will be described hereinafter may be used substantially the same as a relay station considered by a 3GPP IMT-A (LTE-A) system.

Project authorization request (PAR) of 802.16j is intended for two following tasks of the standardization project which will be performed:

1. Coverage extension; and
2. Throughput enhancement.

FIG. 1 is a conceptional view illustrating a multi-hop relay system.

In FIG. 1, a reference numeral 101 denotes a base station, reference numerals 102a to 102d denote relay stations, and reference numerals 103a to 103d denote mobile stations. As illustrated in FIG. 1, signal transfer through the relay stations 102a and 102b can be performed at a zone other than the base station 101. Also, the mobile station 103d located within the zone of the base station 101 is allowed to set a path of high quality, which has an adaptive modulation and coding (AMC) scheme of high level through the relay station 102d, whereby enhancement of system throughput can be obtained through the same radio resource.

Under the rule that the mobile station implemented based on the existing 802.16-2004 specification and the existing 802.16e-2005 specification should perform communication with the relay station without any additional function, it is predicted that the standard specification to be made by the 802.16j project has a limited range in accordance with addition of some function for controlling the relay station to the relay station and the existing base station.

The relay station can be regarded as a subscriber mobile station that performs operations of a physical layer and a media access control (MAC) layer. Also, the relay station is mainly controlled by the base station but may have a predetermined control function if necessary. As usage models currently in discussion, in addition to a fixed relay station, various types of relay stations are considered. Examples of such relay stations include a mobile relay station for temporarily providing a service to a specific zone and a relay station that can be built in cars or subways.

When a mobile station that supports a general multi-hop relay initially enters a network or performs an initial network entry procedure with a base station or a relay station, the base station can determine relay through the relay station.

For example, if a channel status between the base station and the mobile station is greater than a specific reference value, the mobile station may try direct communication with the base station. If the channel status is less than the specific reference value, or if the mobile station cannot receive a signal of the base station and has a good channel status with a neighboring relay station, path to the relay station is set.

However, when the mobile station requests an emergency service while performing an initial network entry procedure for registration with the base station, or when the mobile station requests an emergency service while performing communication with the base station or the relay station, a procedure for connection between the mobile station and a neighboring mobile station is not defined if the channel status between the mobile station and the base station or the relay station is less than the specific reference value.

FIG. 2 is a diagram illustrating an example of an emergency status.

In more detail, FIG. 2 illustrates that a base station (BS), a femto base station (FBS) or a relay station (RS) fails to perform a normal function due to natural disaster or other accident.

Referring to FIG. 2, the mobile station may fail to receive a service from a current serving relay station due to an accident occurring in the relay station. At this time, the mobile station may perform a communication service of an emergency mode by shifting to the emergency mode.

SUMMARY OF THE INVENTION

Accordingly, the present invention is directed to a method for supporting emergency communication, which substantially obviates one or more problems due to limitations and disadvantages of the related art.

An object of the present invention is to provide an apparatus and/or method for supporting emergency data communication in a mobile communication system that supports a relay station (RS) and/or a femto base station (FBS).

Another object of the present invention is to provide a method and/or apparatus for configuring an uplink and a downlink of a neighboring mobile station of a corresponding mobile station as a communication path when a base station (BS), the RS or the FBS does not support cell coverage and capacity enough for communication with the corresponding mobile station.

Other object of the present invention is to provide a method for configuring connection between a mobile station and its neighboring base station in a state that a channel status of the mobile station with a base station or a relay station is less than a specific reference value when the mobile station requests an emergency service while performing an initial network entry procedure for registration with the base station or when the mobile station requests an emergency service while performing communication with the base station or the relay station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention relates to a wireless access system, and more particularly, to methods for supporting emergency communication in a relay system.

In one aspect of the present invention, a method for supporting emergency communication in a wireless access system comprises the steps of configuring a path for emergency communication with a first mobile station of an emergency mode and one or more second mobile stations located near the first mobile station; allocating a first resource zone for emergency communication to the first mobile station; transmitting allocation information on the first resource zone to one or more of the first mobile station and the second mobile station; and receiving emergency data through the first resource zone.

The step of configuring a path for emergency communication includes receiving an emergency request signal from the first mobile station; allocating a second resource zone for emergency communication to the first mobile station and the one or more second mobile stations; transmitting allocation information on the second resource zone to the first mobile station and the one or more second mobile stations; receiving channel information indicating channel status with the first mobile station from each of the one or more second mobile stations; and selecting an intermediate mobile station for performing emergency communication with the first mobile station from the one or more second mobile stations.

The allocation information on the second resource zone includes a mode change indicator for changing a transmit mode of the second mobile stations to a receive mode, transmit mode start timing information indicating that the second mobile stations are changed from the receive mode to the transmit mode, and zone information indicating location of the second resource zone.

In this case, the allocation information on the second resource zone is broadcasted to the first mobile station and the one or more second mobile stations through a broadcast channel. Alternatively, the allocation information on the second resource zone is transmitted to the one or more second mobile stations in a unicast type, and the one more second mobile stations are grouped into a predetermined group.

The first resource zone is allocated to an uplink access zone.

In another aspect of the present invention, a method for supporting emergency communication in a wireless access system comprises the steps of transmitting an emergency request signal for requesting emergency communication from a first mobile station to a base station (or one of a relay station (RS) and a femto base station (FBS); receiving a message, which includes information on a first emergency zone allocated for emergency communication, from the base station; and transmitting an emergency signal to one or more second mobile stations by using the information on the first emergency zone.

The method further comprises the steps of receiving a message, which includes information on a second emergency zone allocated for emergency communication, from the second mobile stations; and transmitting the emergency signal to the second mobile stations by using the information on the second emergency zone.

Preferably, the second mobile stations are intermediate mobile stations that share uplink and downlink resources with the first mobile station for emergency communication.

The allocation information on the first emergency zone includes a mode change indicator for changing a transmit mode of the second mobile stations to a receive mode, transmit mode start timing information indicating that the second mobile stations are changed from the receive mode to the transmit mode, and zone information indicating location of the first emergency zone. In this case, the allocation information on the first emergency zone is broadcasted through a broadcast channel. Alternatively, the allocation information on the first emergency zone is transmitted to the one or more second mobile stations in a unicast type. In this case, the one more second mobile stations are preferably grouped into a predetermined group.

According to the embodiments of the present invention, the following advantages can be obtained.

First of all, the method and/or apparatus for efficiently providing emergency data communication can be implemented by using the technical spirits of the present invention.

Second, as a communication status is deteriorated due to an accident occurring in the base station or the relay station, when the mobile station should perform emergency communication, it can perform emergency communication with other base station or other relay station by using an uplink or downlink of a neighboring base station.

Third, when the mobile station requests an emergency service through its neighboring base station, connection between the mobile station and its neighboring base station can be configured efficiently and stably in accordance with the technical spirits of the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
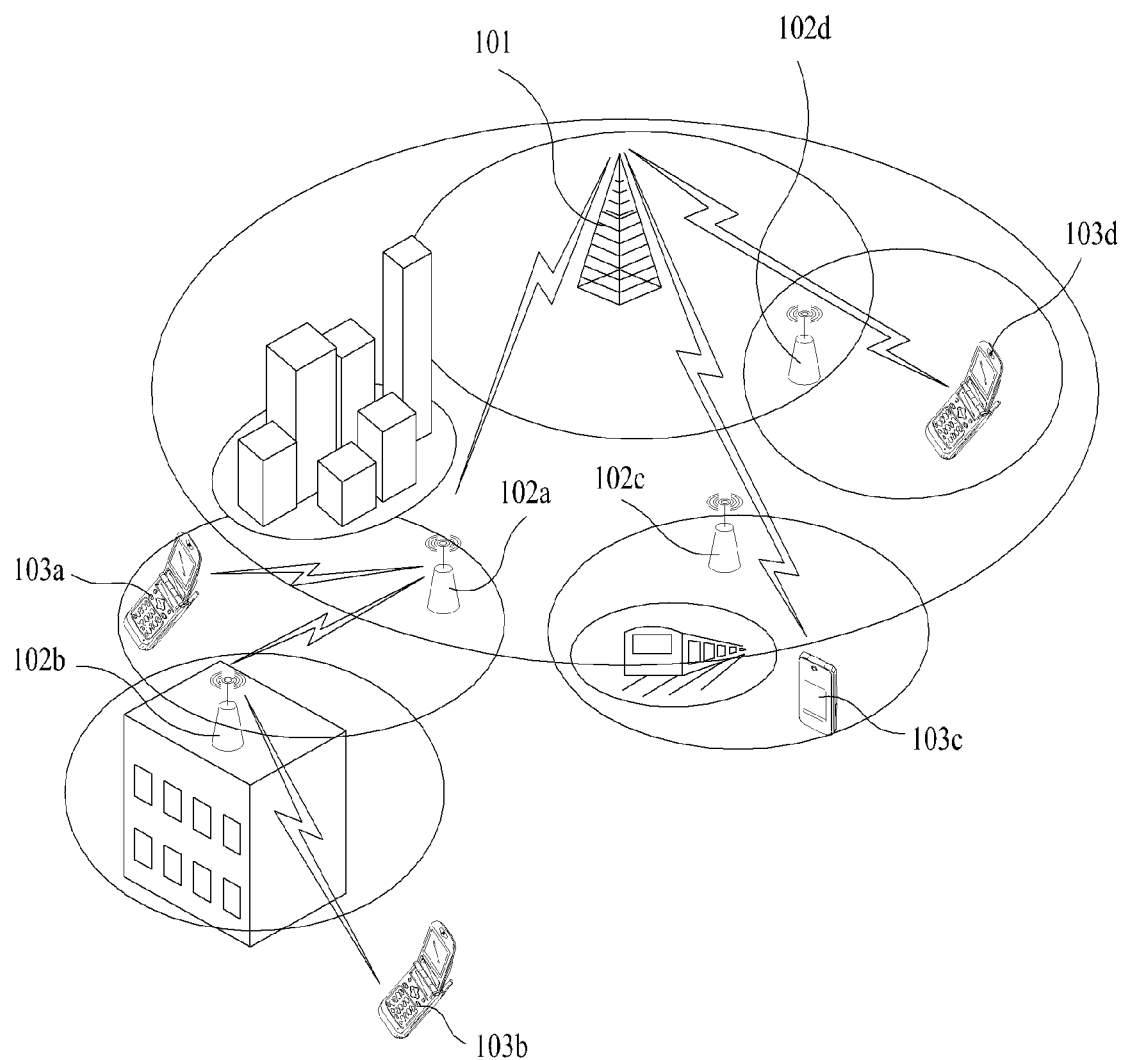
FIG. 1 is a conceptional view illustrating a multi-hop relay system.
Figure 2:
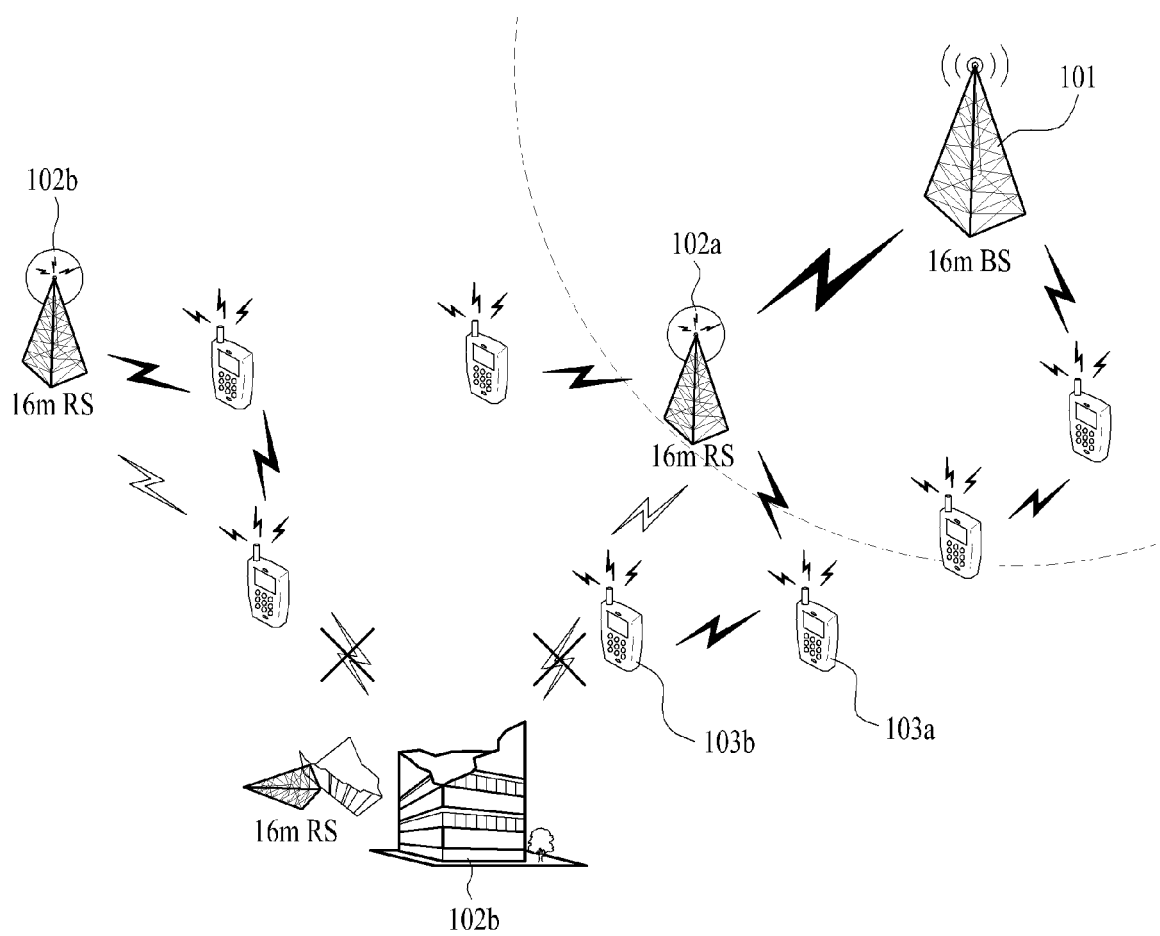
FIG. 2 is a diagram illustrating an example of emergency status.

Reference will now be made in detail to the preferred embodiments of the present invention, examples of which are illustrated in the accompanying drawings. Wherever possible, the same reference numbers will be used throughout the drawings to refer to the same or like parts.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), and an access point (AP). Also, the mobile station may be replaced with terms such as a user equipment (UE), a subscriber station (SS), a mobile subscriber station (MSS), a mobile terminal (MT) and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station further include a hand-held PC, a notebook PC, a smart phone, and a multi mode-multi band (MM-MB) terminal.

In this case, the smart phone is a terminal provided with advantages of a mobile communication terminal and a PDA. The smart phone may mean a terminal in which a schedule management function of a PDA and data communication functions of facsimile transmission/reception, internet access, etc. are integrated on a mobile communication terminal.

Also, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

The embodiments according to the present invention can be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications can be made in the specific terminologies within the range that they do not depart from technical spirits of the present invention. For example, the relay station may be used as a relay or a relay system.

A usage model of the relay station considered by the 802.16j system can be divided into four types as follows.

1) Flexed Infrastructure

The flexed infrastructure is intended for cell coverage extension and data transmission rate of a base station (BS). The relay station may be installed by a service provider as a fixed RS similarly to the base station, or may be purchased and installed by a subscriber who wants convenience in network connection. In the fixed infrastructure, the relay station is installed and managed at a place that provides LOS channel condition with the base station.

2) In-Building Coverage

The relay station may be installed by a service provider or subscriber to remove a service shadow area in buildings and enhance a transmission rate. Examples of this type relay station include a fixed RS and s a nomadic RS that provides a mobile service in a limited area. This type relay station may be installed in tunnels or subway stations.

3) Temporary Coverage

The fixed RS is temporarily used to cover a place that cannot provide coverage and channel capacity of the base station sufficiently. The fixed RS may be provided in a type of a nomadic RS. A temporary coverage usage model can be provided for recovery of disaster or emergency. Also, the temporary coverage usage model can be used temporarily for active service in such a manner that excessive service traffic at an event place crowded with many users is distributed into neighboring base stations.

4) Coverage on a Mobile Vehicle

In order to provide a stable service to users on a vehicle such as a train, bus or passenger ship, which is crowded with the users and passes by a cell at high speed, a mobile RS can be used.

Figure 3:
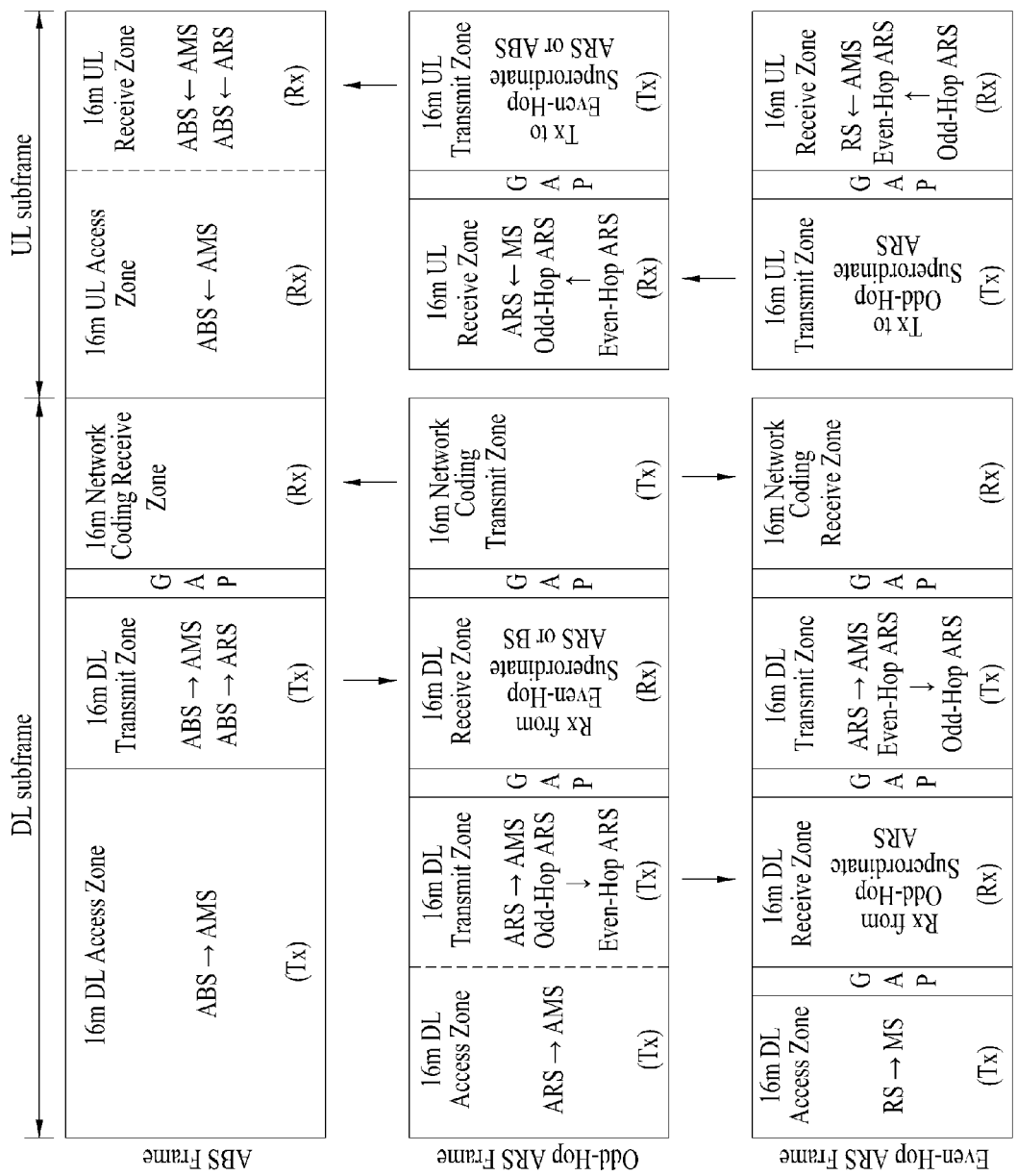
FIG. 3 is a diagram illustrating a relay frame structure to which the embodiments of the present invention can be applied.

FIG. 3 is a diagram illustrating a relay frame structure to which the embodiments of the present invention can be applied.

In more detail, FIG. 3 illustrates a frame structure that supports a multi-hop relay discussed in the IEEE 802.16m. The 16m relay frame structure supports a non-transparent RS of a multi-hop. In this case, a non-transparent mode is used when the mobile station exists at the cell edge of the base station or beyond the cell coverage, and represents that the relay station transmits a control signal or map information to the mobile station. Also, a transparent mode means that the mobile station can directly receive a control signal (for example, SCH or BCH) or map information from the base station. In other words, in the transparent mode, the base station can transmit control signals to the base station by controlling the relay station.

A 16m downlink (DL) access zone of a downlink subframe is an interval where the BS and the RS transmit synchronization and control information to the mobile station (MS) within each zone, and is operated in the same manner as a downlink access zone of the 16j non-transparent RS.

A multi-hop relay frame structure of an odd hop RS is configured in the order of a 16m downlink transmit zone and a 16m downlink receive zone. A multi-hop relay frame structure of an even hop RS is configured in the order of a 16m downlink receive zone and a 16m downlink transmit zone. Also, in order to solve delay in a UL relay zone of 16j, an uplink subframe is configured in the order of a 16m uplink (UL) receive zone and a 16m uplink transmit zone in an odd hop and in reverse order in an even hop.

A 16m network coding zone can selectively be applied to the base station and the relay station (RS). At this time, it is preferable that a network coding transmit zone is located in the RS of the odd hop that directly performs communication with the base station. It is also preferable that a network coding receive zone is located in the subframe of the RS of the even hop and the base station.

The multi-hop frame structure of the IEEE 802.16m, as illustrated in FIG. 3, supports time division duplex (TDD) within one frame of a period of 5 msec, for example. The multi-hop frame structure may additionally support frequency division duplex (FDD) and TDD/FDD mode for a plurality of frames. Also, each zone may be configured in a subframe unit for a frame that includes a plurality of subframes, or may be configured in a frame unit for a plurality of frames.

Figure 4:
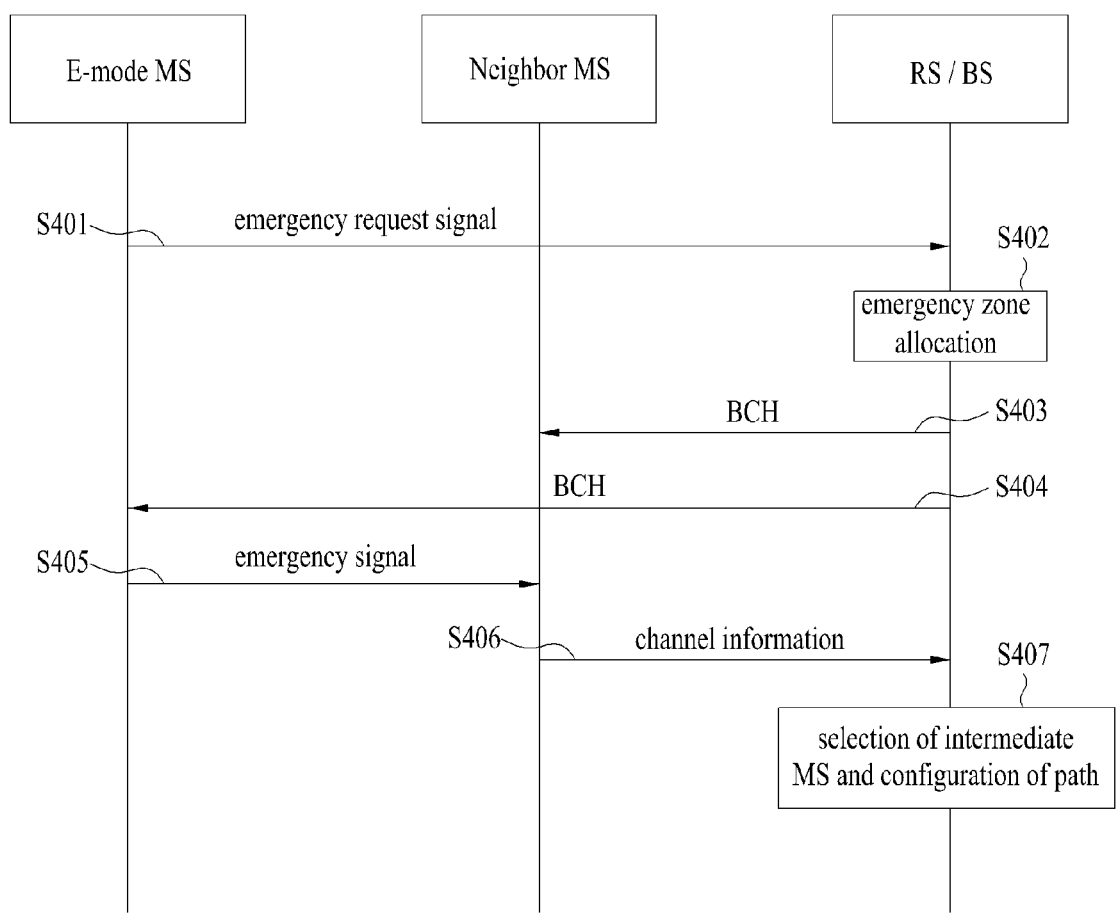
FIG. 4 is a diagram illustrating one of methods for configuring a path for supporting emergency communication in accordance with one embodiment of the present invention.

FIG. 4 is a diagram illustrating one of methods for configuring a path for supporting emergency communication in accordance with one embodiment of the present invention.

In the embodiments of the present invention, a mobile station that performs communication with a relay station and/or a base station through configuration of downlink and uplink paths with a neighboring mobile station (N-MS) will be referred to as an emergency mode mobile station (E-Mode MS, hereinafter, referred to as "E-MS"). Also, in the embodiments of the present invention, the E-MS can perform emergency communication with the base station, the relay station or the femto base station. Hereinafter, for convenience of description, emergency communication according to the present invention will be described based on a procedure of configuring a path between the E-MS and the relay station (RS). However, it is to be understood that emergency communication according to the present invention may equally be applied to a procedure of configuring a path between the E-MS and the base station or the femto base station.

The E-MS transmits an emergency request signal to the RS to request an emergency mode (E-Mode) (S401).

In the step 5401, the emergency request signal can be transmitted in accordance with three types as follows.

First of all, the E-MS can transmit an emergency request signal based on contention during a ranging procedure for initial network entry. In this case, the emergency request signal could be a predetermined ranging code or an E-mode request indicator. The emergency mode request indicator can be included in a predetermined ranging medium access control (MAC) management message and then transmitted to the relay station.

Second, the E-MS can transmit an emergency request signal to the relay station in case of bandwidth request. In this case, the emergency request signal can be transmitted together with a bandwidth request (BR) message or a BR header.

Third, the E-MS can transmit channel status information (e.g. CQI) to the relay station together with a report message (e.g., MOB REP-RSP) that includes an emergency request signal.

However, in the three methods, the E-MS can transmit the emergency request signal to the relay station through various messages or channels without limitation to the above message or indicators. At this time, the emergency request signal may be transmitted through a predetermined emergency channel, or a radio channel designated by the relay station.

Referring to FIG. 4 again, the relay station which has received the emergency request signal from the E-MS can allocate an emergency zone to the uplink subframe, wherein the emergency zone is intended for transmitting the emergency message from the E-MS. At this time, the emergency zone may mean all allocation zones related to message or signals for performing emergency communication in the E-MS (S402).

The relay station can transmit a specific message to the E-MS and/or N-MSs such that the N-MSs can receive emergency messages transmitted from the E-MS, wherein the specific message includes allocation information on the emergency zone (S403 and S404).

The allocation information on the emergency zone may include a mode change indicator for changing a transmit mode of the N-MSs to a receive mode, receive mode information (or transmit mode start timing information) indicating that the receive mode of the N-MSs is again changed to the transmit mode, and location information on an emergency zone for transmitting an emergency message received from the E-MS.

In the steps 5403 and 5404, the specific message can be broadcasted in a type of a broadcast channel (BCH). If the relay station knows the location of the E-MS, it can transmit the specific message in a unicast type by grouping or designating neighboring mobile stations of the E-MS that has requested E-mode.

In the steps 5403 and 5404, the mode change indicator may have a size of 1 bit. If the mode change indicator is set to '0', it indicates a transmit (Tx) mode. If the mode change indicator is set to '1', it indicates a receive (Rx) mode. The receive mode information can be represented by a duration value having a predetermined time length. If the receive mode information indicates information on start timing of change to the transmit mode, the transmit mode start timing can be represented by a start offset value or a frame number (or subframe number).

The E-MS can transmit an emergency signal or an emergency message to one or more N-MSs. In addition, the E-MS can transmit a random signal for measuring channel status with N-MSs in addition to the emergency signal to one or more N-MSs (S405).

In the step 5405, one or more N-MSs can measure the channel status with the E-MS when receiving the emergency signal from each E-MS. At this time, the N-MSs can receive the emergency signal from the E-MS by using the information received in the step 5403. Also, the N-MSs can transmit channel information indicating the channel status with the E-MS to the relay station through the emergency zone allocated in the step 5403 (S406).

The relay station can determine a path by selecting intermediate MS (I-MS) from one or more N-MSs around the E-MS based on the channel information, wherein the I-MS receives the emergency signal (or emergency message) from the E-MS and then transmits the received emergency signal to the relay station. At this time, one I-MS may be selected, or two or more I-MSs may be selected depending on the communication status to configure one or more paths (S407).

Figure 5:
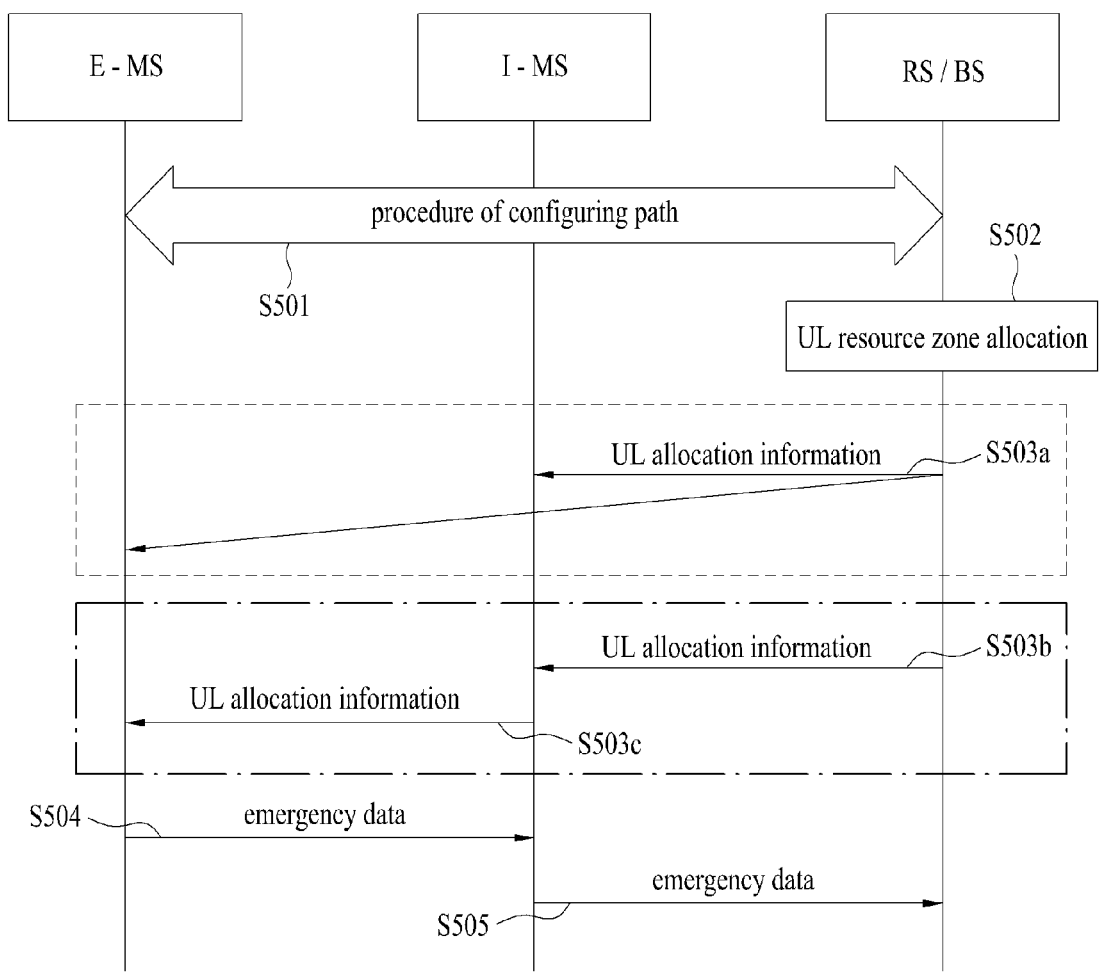
FIG. 5 is a diagram illustrating one of methods for allocating an uplink resource zone from a relay station in accordance with one embodiment of the present invention.

FIG. 5 is a diagram illustrating one of methods for allocating an uplink resource zone from a relay station in accordance with one embodiment of the present invention.

Referring to FIG. 5, the E-MS, the N-MSs and the RS (for example, macro base station and femto base station) can configure one or more emergency paths for performing emergency communication. At this time, the emergency path can be configured using the procedure of configuring a path, which is illustrated in FIG. 4 (S501).

The RS can allocate an uplink resource zone for emergency communication to the E-MS and I-MS. At this time, the uplink resource zone can equally be allocated to the E-MS and the I-MS (S502).

In other words, the I-MS and the E-MS can be configured in pairs, and can be identified by a transmit mode or a receive mode. For example, in the same uplink resource zone, the E-MS transmits emergency data to the I-MS while the I-MS receives the emergency data.

The relay station can broadcast uplink resource zone allocation information (e.g., UL allocation information) to the I-MS and the E-MS by using the UL-MAP message or USCCH (S503*a*).

In the step S503*a*, the relay station can report the uplink resource zone allocation information to the I-MS and the E-MS in a unicast type instead of broadcasting UL allocation information by using the UL-MAP message or USCCH. In other words, since the path is configured between the relay station and the I-MS through the procedure of configuring a path in the step 5501, the relay station can transmit the UL allocation information to the I-MS by using a predetermined message (S503*b*), and the I-MS can transmit the UL allocation information to the E-MS (S503*c*).

The step S503*a* and the step S503*b* or S503*c* can be used selectively. Also, the E-MS and the I-MS, which have received the UL allocation information through the step S503*a* or the step S503*b* or S503*c*, can transmit emergency data to the uplink resource zone indicated by the UL allocation information. In other words, the E-MS can transmit emergency data to the I-MS through the allocated uplink resource zone (S504), and the I-MS can transmit the received emergency data to the relay station (S505).

However, in another aspect of the present invention, the E-MS may transmit emergency data to the relay station without through the I-MS. Under the emergency status, since a plurality of data are neither transmitted nor received, and stable and robust data are transmitted and received, communication can be performed even in case of weak connection. Also, since the E-MS knows allocation information on the uplink resource zone through the step S503*a* to the step S503*c*, it can directly transmit emergency data to the relay station without through the I-MS.

Figure 6:
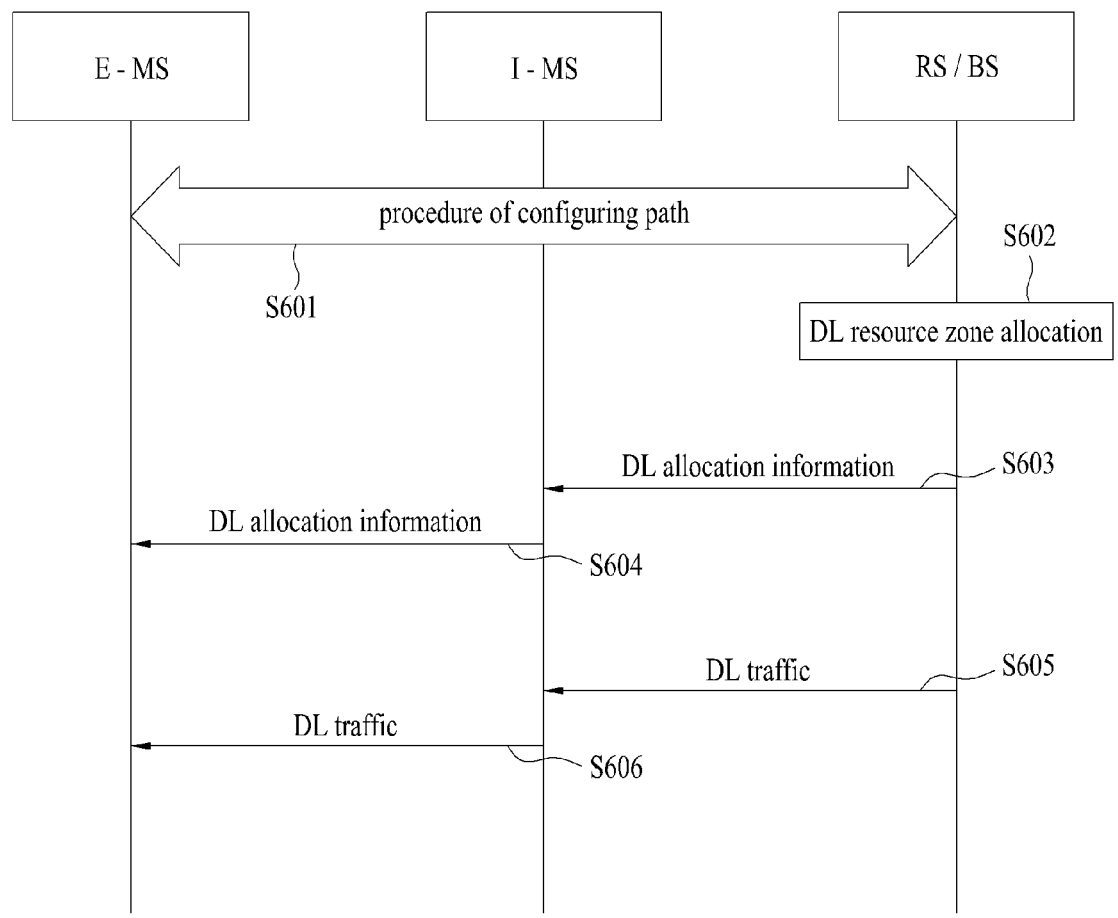
FIG. 6 is a diagram illustrating one of methods for allocating an uplink resource zone from a relay station in accordance with another embodiment of the present invention.

FIG. 6 is a diagram illustrating one of methods for allocating an uplink resource zone from a relay station in accordance with another embodiment of the present invention.

Referring to FIG. 6, the E-MS, the N-MSs and the relay station (for example, macro base station and femto base station) can configure one or more emergency paths for performing emergency communication. At this time, the emergency path can be configured using the procedure of configuring a path, which is illustrated in FIG. 4 (S601).

The relay station can allocate a downlink resource zone for emergency communication to the E-MS and I-MS. At this time, the downlink resource zone can equally be allocated to the E-MS and the I-MS (S602).

Also, the I-MS and the E-MS can be configured in pairs, and can be identified by a transmit mode or a receive mode. For example, in the same downlink resource zone, the I-MS transmits emergency data to the E-MS while the E-MS receives the emergency data.

The relay station can broadcast downlink resource zone allocation information (e.g., DL allocation information) to the I-MS and the E-MS by using DL-MAP message or DSCCH (un-shown). Also, the relay station can report the downlink resource zone allocation information to the I-MS and the E-MS in a unicast type. For example, the relay station can transmit a predetermined message, which includes the downlink resource zone allocation information, to the I-MS (S603), and the I-MS can transmit the downlink resource zone allocation information to the E-MS (S604).

The relay station transmits downlink traffic to the I-MS through the DL resource zone allocated for emergency service (S605), and the I-MS connected with the E-MS transmits the downlink traffic to the E-MS (S606).

A message the same as or different from the emergency data used in the step 5504 may be used as the emergency signal used in the step 5405 of FIG. 4. Also, the emergency zone allocated in the step 5402 is used to configure the path for emergency communication, but may be configured as the same zone as the resource zone allocated in the step 5502 or the step 5602. The emergency zone allocated in the step 5402 may be different from the resource zone in the step 5502 or the step 5602.

Figure 7:
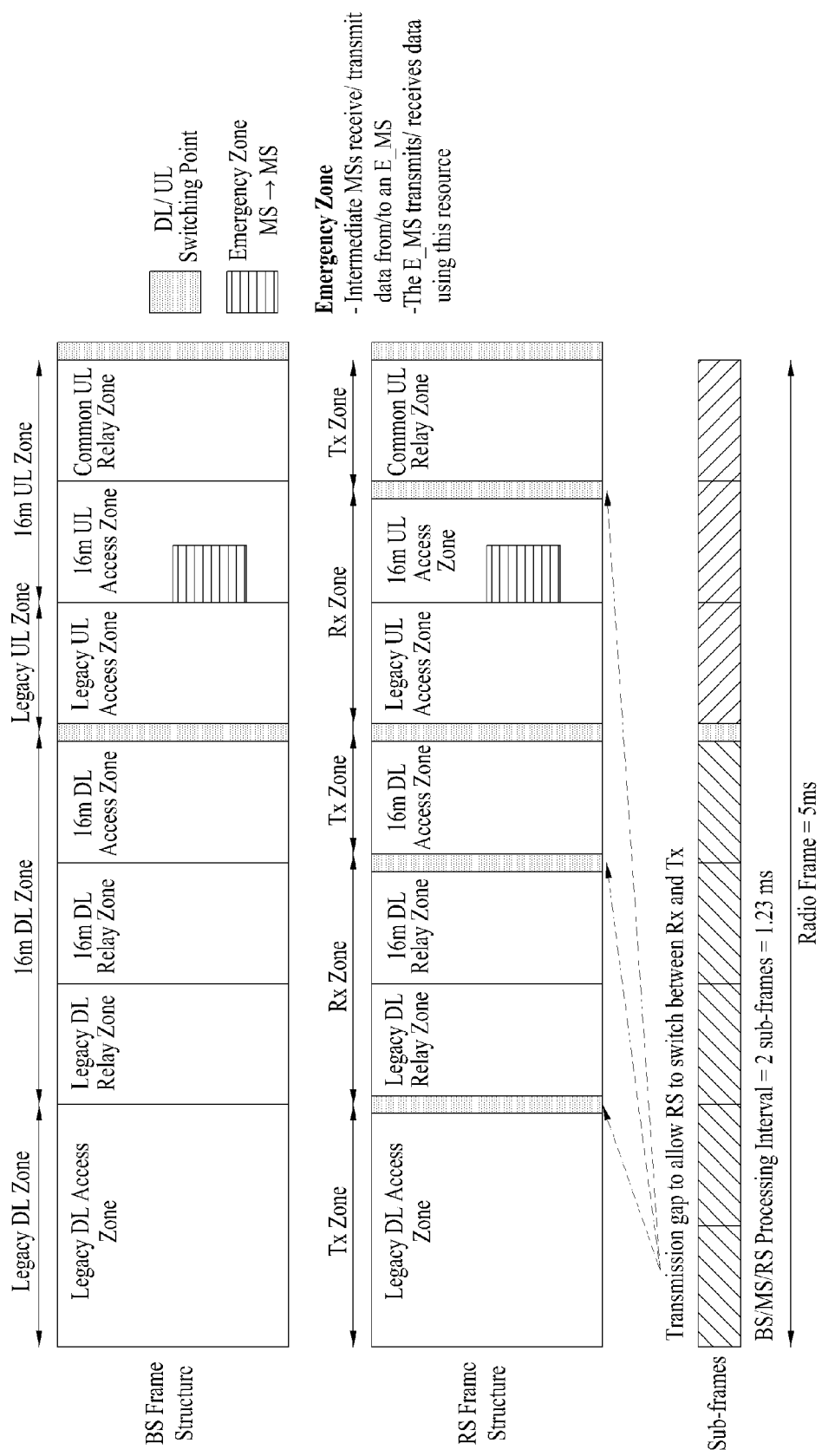
FIG. 7 is a diagram illustrating an example of a frame structure that includes an emergency zone to which the embodiments of the present invention can be applied.

FIG. 7 is a diagram illustrating an example of a frame structure that includes an emergency zone to which the embodiments of the present invention can be applied.

In more detail, FIG. 7 illustrates an uplink emergency zone for emergency communication between the E-MS and the I-MS, which is implemented in the frame structure configured based on the TDD mode. In FIG. 7, one frame has a length of 5 ms, and a downlink subframe to uplink subframe ratio is 5:3.

In FIG. 7, the BS frame structure can be configured in the order of a legacy DL zone, a legacy UL zone, a 16m DL zone and a 16m UL zone. Also, the RS frame structure can be configured to correspond to the BS frame structure. The RS frame structure may be configured in the repeated order of Tx zone, Rx zone, Tx zone, Rx zone, and Tx zone.

At this time, the emergency zone for emergency communication may be included in the 16m uplink access zone of the 16m UL zone in the BS frame structure. Also, in the RS frame structure, the emergency zone may be allocated to the 16m uplink access zone that includes Rx zone.

The I-MS can transmit and receive data to and from the E-MS and the relay station through the emergency zone. Also, the E-MS can transmit and receive emergency data to and from the I-MS through the emergency zone. The E-MS can directly transmit and receive emergency data to and from the relay station through the emergency zone.

Figure 8:
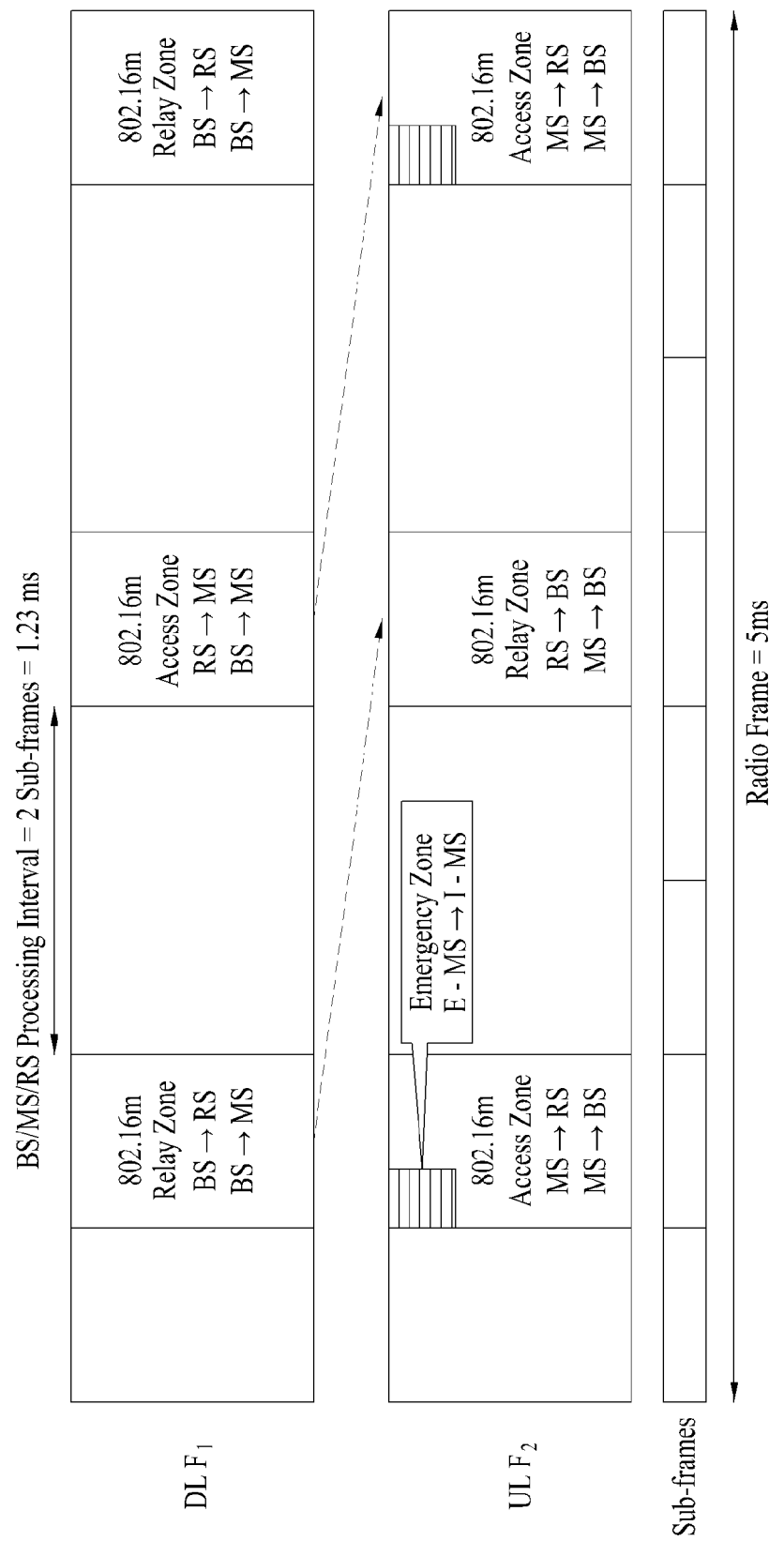
FIG. 8 is a diagram illustrating another example of a frame structure that includes an emergency zone to which the embodiments of the present invention can be applied.

FIG. 8 is a diagram illustrating another example of a frame structure that includes an emergency zone to which the embodiments of the present invention can be applied.

In more detail, FIG. 8 illustrates an uplink emergency zone for emergency communication between the E-MS and the I-MS, which is implemented in the frame structure configured based on the FDD mode. In FIG. 8, one frame has a length of 5 ms, and one DL or UL zone exists in one frequency. Also, it is assumed that a processing interval between the BS/RS and the MS is 2 subframe interval (1.23 ms). In the same manner as FIG. 7, the emergency zone in FIG. 8 can be located in the uplink subframe. Preferably, the emergency zone in FIG. 8 is allocated to the 802.16m access zone.

Although FIG. 7 and FIG. 8 illustrate that the emergency zone is allocated to the uplink, the emergency zone may be allocated to the downlink based on the same technical feature.

Hereinafter, a method for supporting emergency communication between the base station and the mobile station without the procedure of configuring a path in FIG. 4 will be described in accordance with another embodiment of the present invention.

The methods of FIG. 5 and FIG. 6 may be performed preferably after the procedure of configuring a path in FIG. 4 is performed. However, the methods of FIG. 5 and FIG. 6 may be performed without the procedure of configuring a path in FIG. 4. In this case, the base station or the relay station may randomly allocate the resource zone (e.g. emergency zone) for performing emergency communication and the base station is able to notify the allocated resource zone to the E-MS and the I-MS of it.

Figure 9:
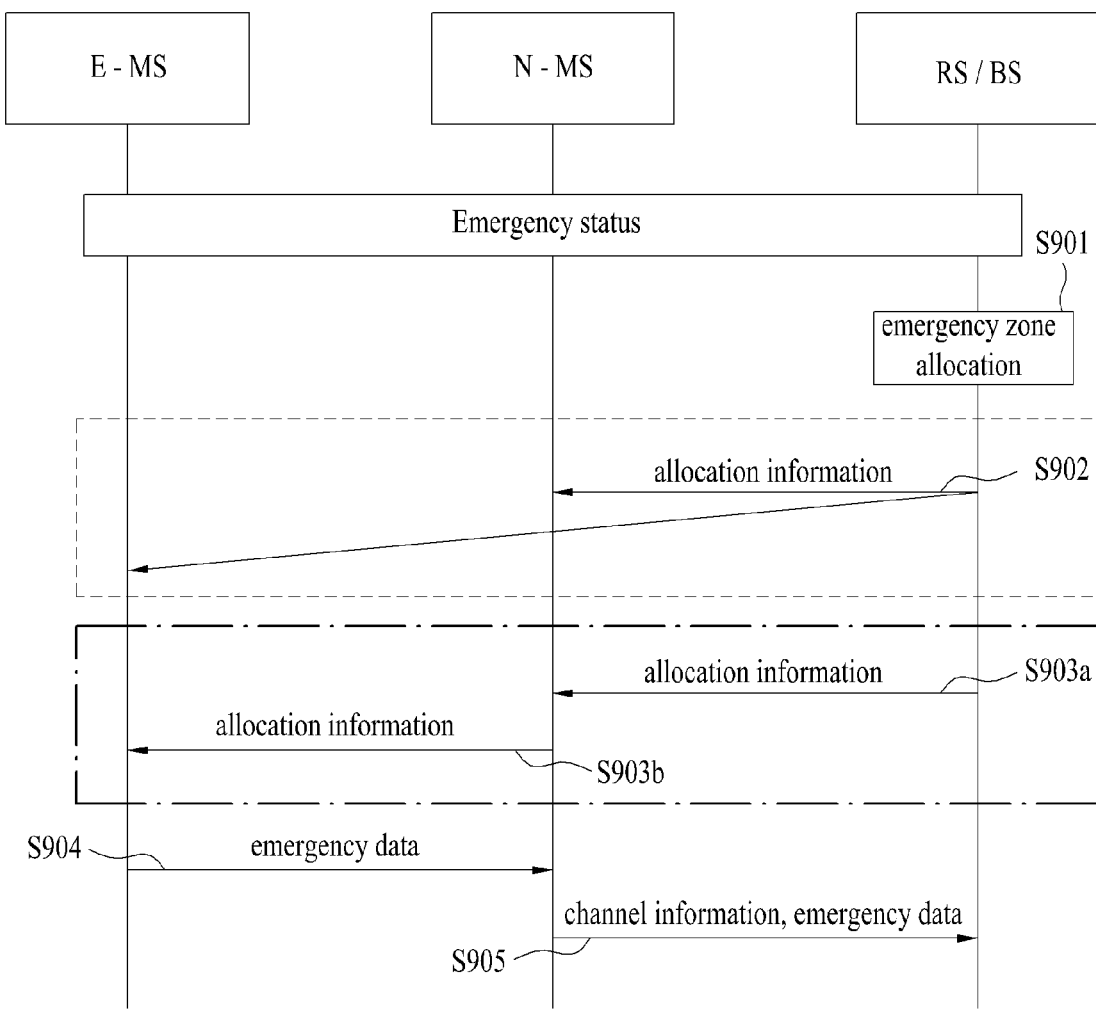
FIG. 9 is a diagram illustrating one of methods for allocating an uplink resource zone from a relay station in accordance with still another embodiment of the present invention.

FIG. 9 is a diagram illustrating one of methods for allocating an uplink resource zone from a relay station in accordance with still another embodiment of the present invention.

Natural disaster and emergency status may occur in the base station or the relay station while the mobile station and the base station are performing data communication. In this case, the base station (or relay station) may determine emergency status even without request of the mobile station (for example, E-MS). Accordingly, the base station can allocate an emergency zone for transmitting an emergency message from the mobile station (E-MS) even without request of the mobile station (S901).

In the step 5901, the uplink resource zone and/or the downlink resource zone can be allocated to the emergency zone. At this time, the emergency zone may mean all allocation zones related to the messages or signals for performing emergency communication in the E-MS.

The base station broadcasts a broadcast channel, UL-MAP message or USCCH, which includes allocation information on the emergency zone, to the E-MS and/or the N-MSs, such that the N-MSs receive emergency message transmitted from the E-MS (5902).

If the base station knows the location of the E-MS, it can transmit the allocation information by using in a unicast type by grouping or designating neighboring mobile stations of the E-MS (S903a). Also, the neighboring mobile station N-MS that has received the allocation information from the base station can transmit the allocation information to the E-MS (S903b).

The step 5902 and the steps S903a and S903b can be used selectively depending on user requirements or channel status.

In the steps 5902 and the steps S903a and S903b, the allocation information on the emergency zone may include a mode change indicator for changing a transmit mode of the N-MSs to a receive mode, receive mode information (or transmit mode start timing information) indicating that the receive mode of the N-MSs is again changed to the transmit mode, and location information (e.g., downlink subframe and/or uplink subframe) on an emergency zone for transmitting an emergency message received from the E-MS.

The mode change indicator may have a size of 1 bit. If the mode change indicator is set to '0', it indicates a transmit (Tx) mode. If the mode change indicator is set to '1', it indicates a receive (Rx) mode. The receive mode information can be represented by a duration value having a predetermined time length. If the receive mode information indicates information on start timing of change to the transmit mode, the transmit mode start timing can be represented by a start offset value or a frame number (or subframe number).

The E-MS can transmit an emergency signal or an emergency message to one or more N-MSs. However, the E-MS can transmit a random signal for measuring channel status with N-MSs in addition to the emergency signal to one or more N-MSs (S904).

One or more N-MSs can receive the emergency signal from the E-MS by using the information received in the step S902 or 5903. Also, the N-MSs can measure the channel status with the E-MS when receiving the emergency signal from each E-MS. Accordingly, the N-MSs can transmit channel information indicating the channel status with the E-MS and emergency data to the base station through the emergency zone allocated in the step 5902 and the step S903a (S905).

Hereinafter, as still another embodiment of the present invention, a mobile station and a base station (or relay station) through which the embodiments of the present invention illustrated in FIG. 3 to FIG. 9 can be carried out will be described.

The mobile station is operated as a transmitter in an uplink, whereas the mobile station is operated as a receiver in a downlink. Also, the base station is operated as a receiver in the uplink, whereas the base station is operated as a transmitter in the downlink. In other words, each of the mobile station and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages.

The mobile station used in the embodiments of the present invention can include a low power radio frequency (RF)/intermediate frequency (IF) module. Also, the mobile station can include means, modules or parts that perform a controller function for performing the aforementioned embodiments of the present invention, a medium access control (MAC) frame variable control function according to service characteristics and radio wave condition, a handover function, an authentication and encryption function, a packet modulation and demodulation function for data transmission, a quick packet channel coding function and a real-time modem control function.

The base station can transmit data received from its upper layer to the mobile station through a wireless or wire cable. The base station can include a low power radio frequency (RF)/intermediate frequency (IF) module. Also, the base station can include means, modules or parts that perform a controller function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function.

The embodiments of the present invention can be applied to various wireless access systems. Examples of the various wireless access systems include 3GPP (3rd Generation Partnership Project), 3GPP2 and/or IEEE 802.xx (Institute of Electrial and Electronic Engineers 802) system. The embodiments of the present invention can be applied to all technical fields based on the various wireless access systems as well as the various wireless access systems.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for supporting emergency communication by a network in a wireless access system, the method comprising:
   receiving an emergency request signal from a first mobile station;
   allocating first resource for emergency communication to the first mobile station;
   transmitting, to the first mobile station and a plurality of second mobile stations, allocation information on the allocated first resource for the emergency communication, wherein the plurality of second mobile stations are located near the first mobile station;
   receiving, from each of the plurality of second mobile stations, channel status information indicating channel status between the first mobile station and each of the plurality of second mobile stations; and
   selecting an intermediate mobile station for performing emergency communication with the first mobile station among the plurality of second mobile stations based on the received channel status information.

2. The method of claim 1, further comprising:
   allocating second resource for emergency communication between the first mobile station and the intermediate mobile station;
   transmitting allocation information on the allocated second resource to the intermediate mobile station: and
   receiving emergency data through the second resource.

3. The method of claim 1, wherein the allocation information on the allocated first resource includes a mode change indicator for changing a transmit mode of the second mobile stations to a receive mode, transmit mode start timing information indicating that the second mobile stations are changed from the receive mode to the transmit mode, and zone information indicating location of the first resource.

4. The method of claim 1, wherein the allocation information on the allocated first resource is broadcasted to the first mobile station and the plurality of second mobile stations through a broadcast channel.

5. The method of claim 1, wherein the allocation information on the allocated first resource is transmitted to the plurality of second mobile stations in a unicast type, and the plurality of second mobile stations are grouped into a predetermined group.

6. The method of claim 1, wherein the second resource is allocated to an uplink access zone.

7. A method for supporting emergency communication by a first mobile station in a wireless access system, the method comprising steps of:
   transmitting, to a network, an emergency request signal for requesting emergency communication;
   receiving, from the network, allocation information on first resource allocated for emergency communication;
   transmitting signals for measuring channel status to a plurality of second mobile stations by using the allocated first resource, wherein the plurality of second mobile stations are located near the first mobile station;
   receiving, from a intermediate mobile station, allocation information on second resource allocated for emergency communication, wherein the intermediated mobile station is selected by the network among the plurality of second mobile stations based on the channel status; and
   transmitting, to the intermediate mobile station, emergency data by using the second resource.

8. The method of claim 7, wherein the intermediate mobile station shares uplink and downlink resources with the first mobile station for emergency communication.

9. The method a of claim 7, wherein the allocation information on the first resource includes a mode change indicator for changing a transmit mode of the second mobile stations to a receive mode, transmit mode start timing information indicating that the second mobile stations are changed from the receive mode to the transmit mode, and zone information indicating location of the first resource.

10. The method as claimed in of claim 7, wherein the allocation information on the first resource is broadcasted through a broadcast channel.

11. The method of claim 7, wherein the allocation information on the first resource is transmitted to the plurality of second mobile stations in a unicast type, and the plurality of stations are grouped into a predetermined group.

* * * * *

UNITED STATES PATENT AND TRADEMARK OFFICE
CERTIFICATE OF CORRECTION

| | | |
|---|---|---|
| PATENT NO. | : 8,417,213 B2 | Page 1 of 1 |
| APPLICATION NO. | : 12/936473 | |
| DATED | : April 9, 2013 | |
| INVENTOR(S) | : Youn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 268 days.

Signed and Sealed this
Twelfth Day of August, 2014

Michelle K. Lee
*Deputy Director of the United States Patent and Trademark Office*